United States Patent [19]
Murray

[11] Patent Number: 6,131,781
[45] Date of Patent: Oct. 17, 2000

[54] EQUIPMENT LOAD ASSIST TO ROOF RACK

[75] Inventor: Frederick G. Murray, Southington, Conn.

[73] Assignee: Industri AB Thule, Hillerstorp, Sweden

[21] Appl. No.: 08/969,001

[22] Filed: Nov. 12, 1997

Related U.S. Application Data

[60] Provisional application No. 60/031,123, Nov. 18, 1996.

[51] Int. Cl.[7] ............................................. B60R 9/00
[52] U.S. Cl. ........................ 224/310; 224/309; 224/314; 224/319; 224/321; 414/462
[58] Field of Search .................................. 224/310, 309, 224/314, 319, 320, 321; 414/462

[56] References Cited

U.S. PATENT DOCUMENTS

| | | |
|---|---|---|
| 2,521,815 | 9/1950 | Will . |
| 2,800,264 | 7/1957 | McFayden . |
| 2,885,102 | 5/1959 | Duncan . |
| 3,193,124 | 7/1965 | Essling ..................................... 414/462 |
| 3,452,893 | 7/1969 | Heflin ...................................... 224/310 |
| 3,531,006 | 9/1970 | Farchmin . |
| 3,720,358 | 3/1973 | McIntire . |
| 3,777,922 | 12/1973 | Kirchmeyer . |
| 4,139,110 | 2/1979 | Roberts . |
| 4,291,823 | 9/1981 | Freeman et al. . |
| 4,342,411 | 8/1982 | Bott . |
| 4,350,471 | 9/1982 | Lehmann . |
| 4,406,384 | 9/1983 | Schantz . |
| 4,428,517 | 1/1984 | Bott . |
| 4,449,656 | 5/1984 | Wouden .................................. 224/320 |
| 4,940,175 | 7/1990 | Tittel ....................................... 224/324 |
| 5,069,377 | 12/1991 | Baughman . |

(List continued on next page.)

FOREIGN PATENT DOCUMENTS

| | | |
|---|---|---|
| 0363692 | 4/1990 | European Pat. Off. . |
| 0563463 | 10/1993 | European Pat. Off. . |
| 2600953 | 1/1988 | France .................................... 224/310 |
| 2939672 | 4/1981 | Germany . |
| 3102736 | 9/1982 | Germany . |
| 3335173 | 4/1985 | Germany . |
| 3513085 | 10/1986 | Germany . |
| 3641745 | 6/1988 | Germany . |
| 3814799 | 11/1988 | Germany . |
| 3820382 | 12/1989 | Germany . |
| 4122823 | 1/1993 | Germany . |

(List continued on next page.)

*Primary Examiner*—Gregory M. Vidovich
*Assistant Examiner*—Maerena W. Brevard
*Attorney, Agent, or Firm*—Royston, Rayzor, Vickery, Novak & Druce, L.L.P.

[57] ABSTRACT

A load assist to a vehicle rack carrier that includes a brace bar coupleable to a vehicle rack carrier where the brace bar is positionable between extended and retracted configurations relative to the vehicle rack carrier when coupled thereto. A connector is adapted for coupling the brace bar to the vehicle rack carrier and includes a brace bar receiver adapted for accommodating reciprocating motion of the brace bar therein. A handle is coupled to an outer distal end of the brace bar and is adapted for preventing slippage of an object off of the distal end of the brace bar. The couplement of the handle to the outer distal end of the brace bar is by a threaded fastener that establishes a friction fit between the handle and the brace bar. The brace bar has an insert pin receiving aperture therein and there is also included a biased insert pin adapted for insertion into the insert pin receiving aperture. The biased insert pin is coupled to a leaf spring and the leaf spring is adapted to urge the insert pin toward an engaged configuration. A pull tab is coupled to the leaf spring and is adapted to accommodate manual engagement for disengaging the biased insert pin. The connector forms a cross bar receiver and the cross bar receiver is adapted for frictional engagement about a cross bar of the vehicle rack carrier. The connector includes a top half and a bottom half that are adapted to be releasably coupled together to form the brace bar receiver and a cross bar receiver. A depressible safety stop projection extends through the brace bar and is adapted to prevent unintentional disengagement of the brace bar from the load assist.

4 Claims, 4 Drawing Sheets

U.S. PATENT DOCUMENTS

| | | | |
|---|---|---|---|
| 5,201,911 | 4/1993 | Lee | 224/321 |
| 5,232,138 | 8/1993 | Cucheran | 224/321 |
| 5,284,282 | 2/1994 | Mottino | 224/310 |
| 5,360,150 | 11/1994 | Praz | 224/310 |
| 5,782,391 | 7/1998 | Cretcher | 224/310 |

FOREIGN PATENT DOCUMENTS

| | | | |
|---|---|---|---|
| 4324669 | 12/1994 | Germany . | |
| 143483 | 1/1979 | Norway . | |
| 190868 | 1/1923 | United Kingdom | 224/552 |
| 9108929 | 6/1991 | WIPO . | |
| 9403345 | 2/1994 | WIPO . | |

EQUIPMENT LOAD ASSIST TO ROOF RACK

RELATED PATENT APPLICATIONS

This patent application claims priority to U.S. Provisional Application No. 60/031,123 filed Nov. 18, 1996 entitled "EQUIPMENT LOAD ASSIST TO ROOF RACK."

TECHNICAL FIELD

This invention relates generally to vehicular roof top load carrier racks. More specifically, it relates to mechanisms for assisting in the loading process of various items to a roof top supported carrier rack of a vehicle. Even more specifically, it relates to an assist for loading elongate and otherwise cumbersome sport equipment pieces upon roof top sport carrier racks.

BACKGROUND ART

Because sports equipment is most often used at locations distant from where it is stored, various sport equipment racks have been designed for attachment to carrying vehicles. Most often, these racks are either mounted to the rear of a vehicle or upon the vehicle's roof. Many types of sport equipment are intended to be loaded and carried on such roof top racks including bicycles, snow skis, and even small water craft such as canoes and kayaks. The smaller pieces of equipment can normally be lifted and loaded by a single person into position above the vehicle for attachment upon the rack system. Larger pieces of sports equipment such as the canoes and kayaks, however, are typically heavier and more cumbersome thereby requiring either more than one person to easily load the equipment piece or requiring a single person to execute several awkward acts to accomplish the loading process.

A prime example and one for which the present invention is intended to facilitate is the loading of an elongate equipment piece such as a kayak. When a person is working alone to accomplish the loading process, it is difficult to lift the entire boat from ground level to above the vehicle's roof into secured engagement upon the roof rack. Therefore, something as long as a kayak will often be loaded one end at a time. This presents difficulties in that the carrying rack is above the vehicle's roof and therefore the boat must be loaded at a substantial angle if the first end is positioned above the vehicle while the remaining and yet to be loaded end is still at ground level beside the vehicle. As a result, great difficulty can be experienced in such an awkward loading process and the first loaded end may slip from the roof rack during the attempt to load the second end.

For this reason, some people faced with such a problem may attempt to provide a make-shift brace that extends beyond the side of the vehicle where the kayak is to be loaded. Because of the inexact nature of such make-shift solutions, disengagement of the same during a loading process may result in harm to the equipment piece, the carrying vehicle, the supporting roof rack, and/or the person attempting the loading process.

In view of these drawbacks described hereinabove regarding possible attempts to answer these needs for mechanical assistance in the loading of elongate sports equipment to roof rack carriers, the present invention has been developed and designed to alleviate the deficiencies and drawbacks and provide beneficial advantages to such a sport equipment loading process.

DISCLOSURE OF THE INVENTION

The present invention provides an attachable load assist assembly for a vehicularly carried roof rack. In most instances, the roof rack may be configured so that an elongate sport equipment piece such as a canoe or kayak can be longitudinally loaded from front to back of the carrying vehicle. Most examples of such roof racks have clamping means fixed either directly to rails that are mounted to the vehicle's roof or to cross bars extending between such rails for carrying equipment pieces at locations therebetween. Therefore, an elongate equipment piece such as a kayak will typically be loaded from a position at ground level where it is at rest and substantially parallel to the carrying vehicle. To avoid the resultant angle and precarious orientation of the elongate piece of equipment during the loading process as described hereinabove, the present invention provides a load assist that may be removably installed upon the rack system for providing an extendable brace for use during a loading or unloading process.

More specifically, the present invention provides an extendable brace bar that is clamped to the roof rack by an adequately configured connector that permits the bracing bar to slide between extended and retracted positions. Locking mechanisms are provided to fix the brace bar in each of the two utilizable positions. The first being the extended position where the bar projects beyond the side of the vehicle and the second being a retracted position where the brace bar is located substantially above the vehicle between the roof rack rails.

During the loading process, the brace bar is extended beyond the side of the vehicle so that the first end of an elongate sport equipment piece such as a kayak may be initially loaded at a position along side the vehicle, but not necessarily thereabove. A detachable handle is provided at the outer distal end of the brace bar for moving the bar between extended and retracted positions, but the handle also acts as a barricade or retainer for holding the equipment piece thereupon. As a result, the second end of the equipment piece may then be lifted and positioned upon the carrier rack at a height substantially level with the already raised opposite end of the item. In this manner, the tendency of the boat to slip off of the rack during the loading process is alleviated. From this angled, but level position, the boat ends can be easily shifted to locations for proper mounting upon the roof top rack. The bracing bar may then be unlocked and slid back into the roof rack so that it no longer projects beyond the side of the vehicle and assumes a transporting, as opposed to loading configuration.

By providing a load assist as described and disclosed herein, the need for make-shift remedies is obviated and the procedure for loading elongate items is facilitated and made safer through its use. Detailed description of particular embodiments for carrying out the present invention is provided hereinbelow.

MODE(S) FOR CARRYING OUT THE INVENTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Furthermore, elements may be recited as being "coupled"; this terminology's use contemplates elements being connected together in such a way that there may be other components interstitially located between the specified elements, and that the elements so specified may be connected in fixed or movable relation one to the other. Certain components may be described as being "adjacent" to one another. In these instances, it is expected that a relationship so characterized shall be interpreted to mean that the components are located proximate to one another, but not necessarily in contact with each other. Normally there will be an absence of other components positioned therebetween, but this is not a requirement. Still further, some structural relationships or orientations may be designated with the word "substantially". In those cases, it is meant that the relationship or orientation is as described, with allowances for variations that do not effect the cooperation of the so described component or components.

Figure 6:
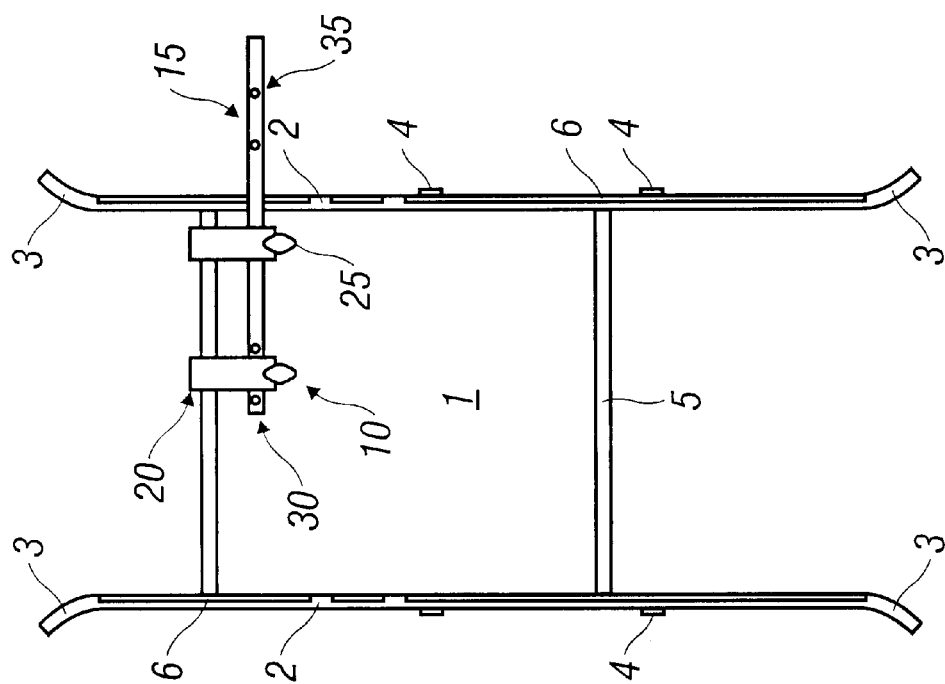
FIG. 6 is an illustration of the embodiment of the present invention as shown in FIG. 5, but with the brace bar in an extended configuration.
Figure 5:
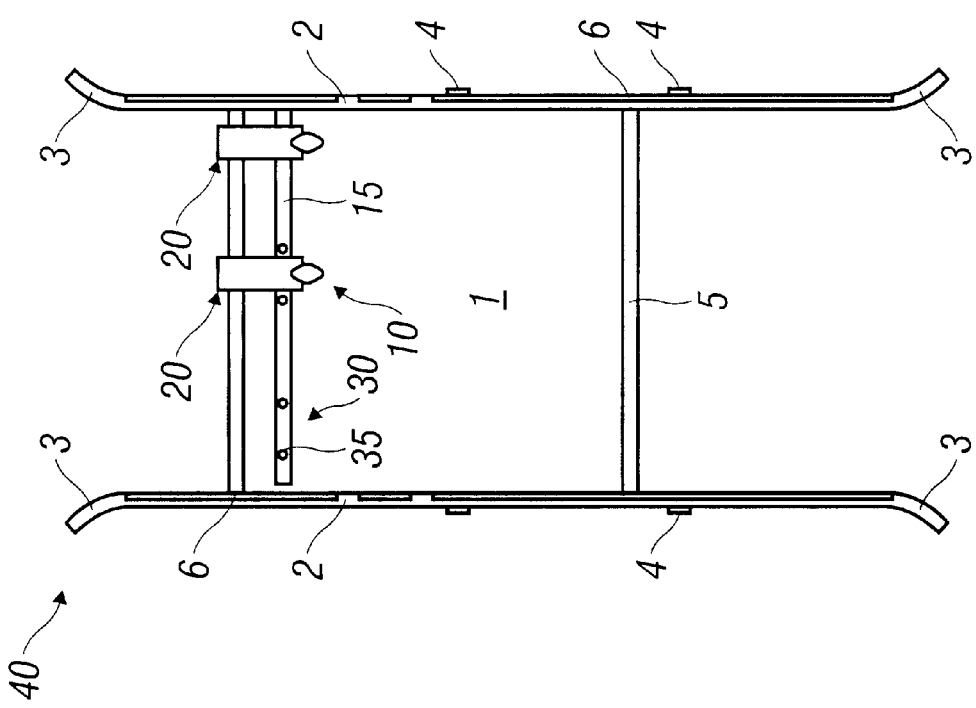
FIG. 5 is a top view of an alternative embodiment of the equipment load assist assembly connected upon a roof rack with the brace bar in a retracted position.

Referring to the Figures, the several components of a roof rack carrier 40 may be seen, together with alternative embodiments of the equipment load assist assembly 10 of the present invention. In the embodiment of FIGS. 5 and 6, the roof rack carrier 40 comprises two rack rails 2 which are supported at forward and rearward ends by rail supports 3. To add additional fortitude to the carrying capability of the rails 2, mid-rail supports 4 are supplementally provided. Cross bars 5 are provided between the longitudinally oriented rack rails 2 and are intended to receive mountings for sport equipment pieces 50 to be carried thereupon. Connections 6 of various configurations are employed between the cross bar 5 and rails 2.

In the alternative embodiment of FIGS. 1–4, the crossbar 5 is mounted to the vehicle roof 1 at independent stanchions or feet 55. Each stanchion 55 is connected to the vehicle 45 and the mounting connection may be achieved in various ways. For versatility, the stanchion 55 may be slidably mounted in tracks carried either directly upon or within the roof's 1 structure or within a rail 2 of the rack system 40.

Figure 1:
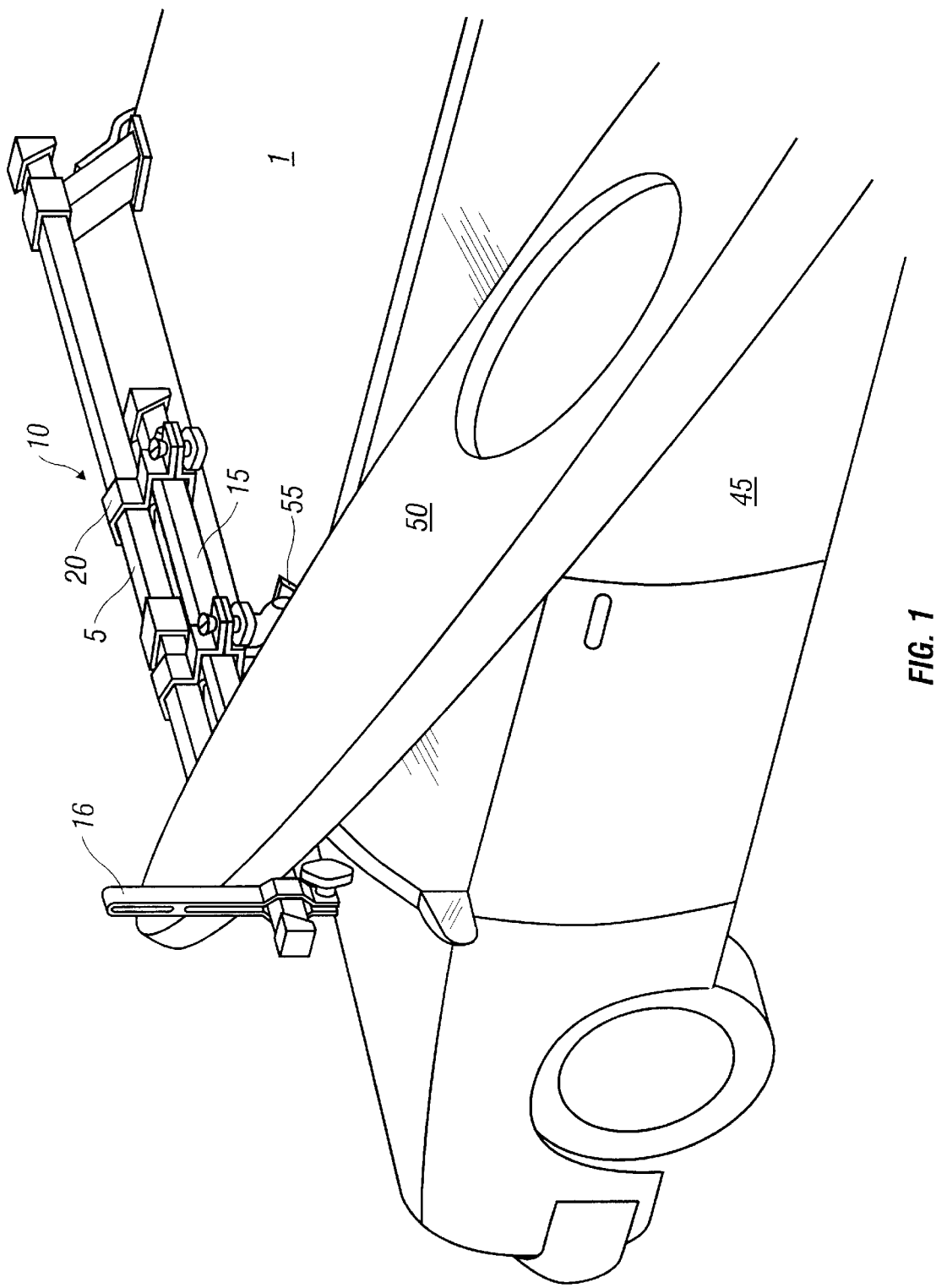
FIG. 1 is a perspective view of the brace bar in an extended position with one end of a kayak positioned thereupon.
Figure 2:
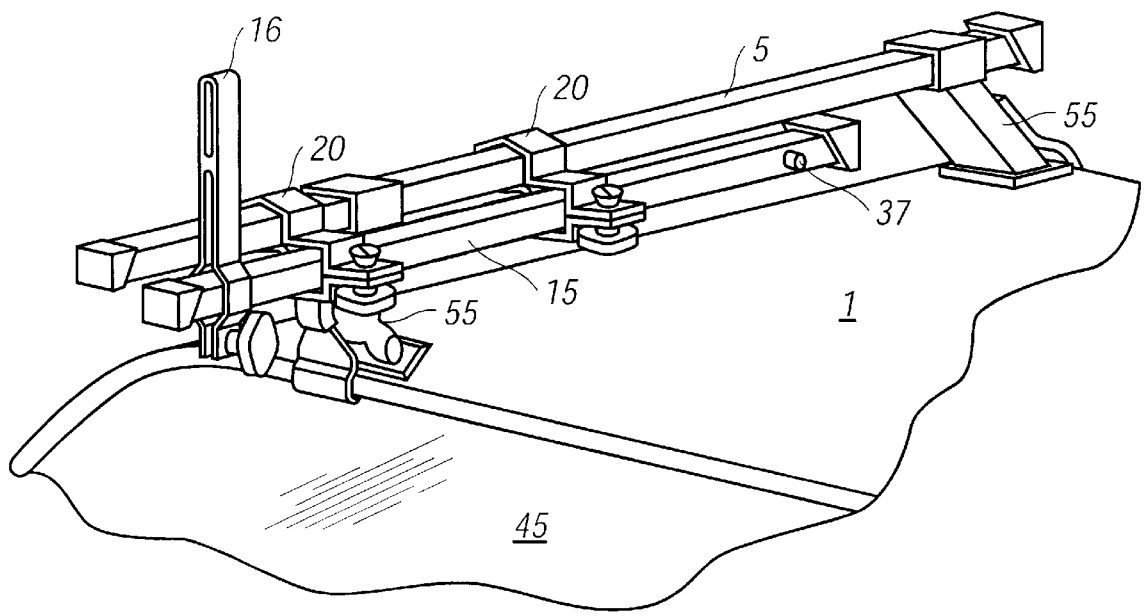
FIG. 2 is perspective view of the equipment load assist assembly connected upon a roof rack cross-bar with the brace bar in the retracted position.
Figure 4:
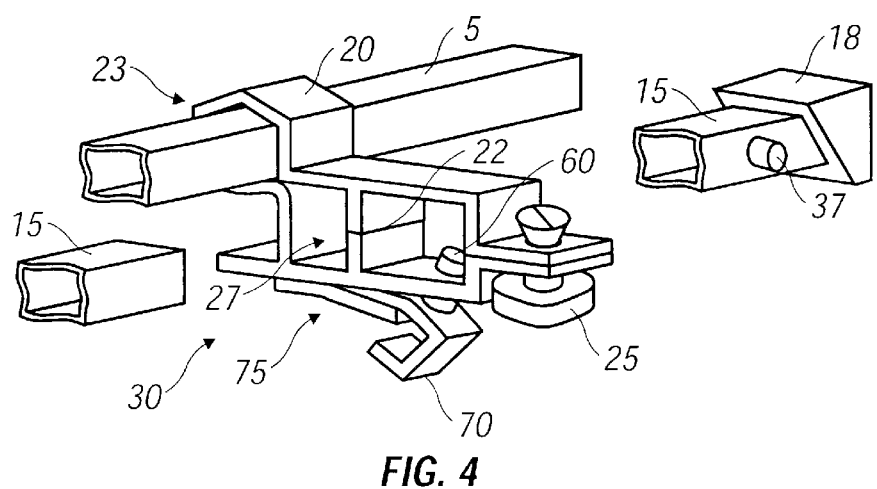
FIG. 4 is a perspective view illustrating details of the connector between the roof rack cross-bar and the load assist's brace bar.
Figure 3:
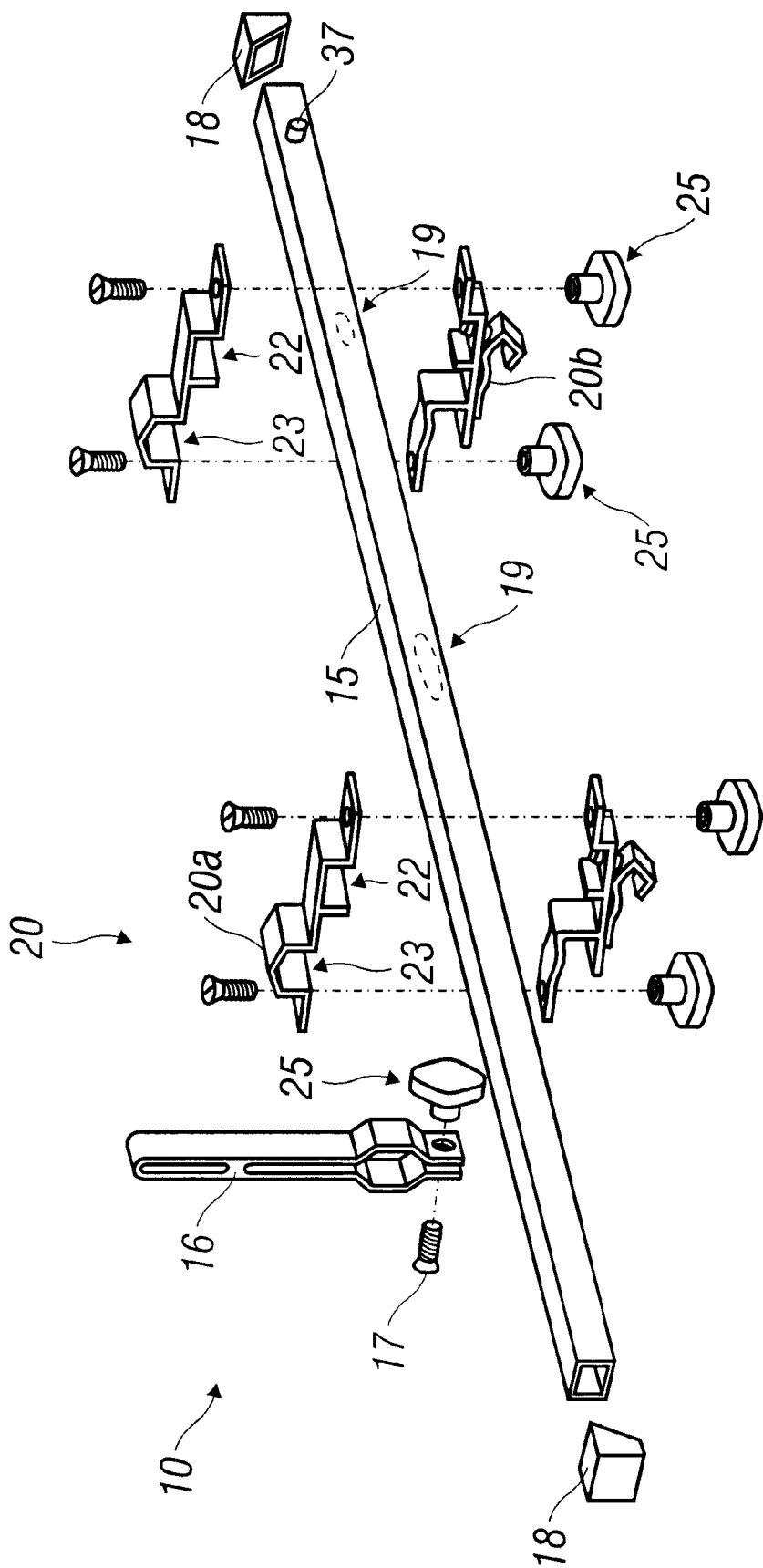
FIG. 3 is an exploded perspective view of the equipment load assist assembly.

FIG. 4 has been added to the following sentence. Referring back to FIGS. 1,2,5 and 6, the attachable equipment load assist assembly 10 is shown attached to the cross bar 5 support of the roof rack carrier system 40 by connectors 20. A pair of connectors 20 are provided, each having one end tightly clamped about the cross bar 5 and an opposite end establishing a brace bar receiver 22. The brace bar receiver 22 forms a through aperture in which the extendable and retractable brace bar 15 slidingly reciprocates between a retracted configuration and an extended configuration.

In use, a cross bar receiver 23 is established about the cross bar 5 by positioning top 20a and bottom 20b engageable halves of the connector 20 about one of the cross bars 5. Threaded and manually tightenable connector fasteners 25 are used to join the two halves of the connector 20 and establish mating engagement therebetween. This two-half construction may be best appreciated in FIG. 3 wherein the cross bar receiver 23 and brace bar receiver 22 are shown. The mating engagement of the half pieces may be appreciated in FIG. 4 where the pieces 20a and 20b are shown in abutment and connected together by fasteners 25. The tightening feature of the fasteners 25 cause the cross bar receiver 23 to tightly engage about the cross bar 5 so that slippage therebetween is prevented.

Because of stop pieces 27 positioned to abuttingly engage one another upon tightening, the brace bar receiver 22 maintains sufficient space within an interior area to assure sufficient clearance between the brace bar 15 and the confines of the receiver 22 so as to assure that the brace bar 15 can be readily slid between the extended and retracted positions.

To keep the brace bar 15 stationary during both transport and loading, support bar location locks 30 are incorporated into the load assist assembly 10. In the illustrated embodiments of FIGS. 5 and 6, these location locks 30 take the form of paired spring biased projections or buttons 35 that protrude from the brace bar 15. Because of the buttons' dual orientation at both sides of the connector 20, the biased projections 35 limit the reciprocating motion of the brace bar 15 within the receiver 22 unless depressed into the bar 15. Therefore, during a loading process, the biased projections 35 are distended and lock the brace bar 15 in the extended configuration illustrated in FIG. 6. As a complement, a second pair of biased projections 35 are provided for locking the brace bar 15 in the retracted position shown in FIG. 5.

An alternative embodiment of the connector 20 is illustrated in FIGS. 1–4 to that shown in FIGS. 5–6. Like the embodiment of FIG. 5–6, the connector 20 of FIGS. 1–4 is tightly fastened about the crossbar 5 and the brace bar 15 is installed through the brace bar receiver 22 for controlled reciprocation therein. Instead of the dual spring biased projections 35 used for restricting movement of the brace bar 15 within the receiver 22 once a desired position is achieved, a single spring biased insert pin 60 is provided that protrudes across an aperture through the brace bar receiver 22 and into a receiving aperture 19 through a wall of the brace bar 15. A plurality of such receiving apertures 19 may be included along the length of the brace bar 15 for accomplishing various locked configurations of the brace bar 15 within the receiver 22 and resultingly with respect to the carrying vehicle. In a preferred embodiment and as shown in detail in FIG. 3, two such insert pin receiving apertures are provided that correspond one to an extended configuration of the brace bar 15 and the other to a retracted configuration of the brace bar 15. As a complement, a spring biased stop 37 is included that is configured from an interior space of the brace bar 15 outwardly and extends from the bar 15 for abutting engagement with the connector 20. In this way, the stop 37 acts as an obstruction so that unintentional disengagement of the brace bar 15 from the load assist assembly 10 is avoided. The stop 37, which is structurally configured in a manner similar to the spring biased insert pin 60 but within the brace bar 15, facilitates intentional disengagement of the brace bar 15 from the load assist assembly 10 for disassembly. This is accomplished by the operator depressing the stop 37 into the brace bar 15 against the biasing spring thereby allowing passage of the bar 15 out of the receiver 22.

Operation of the spring biased insert pin 60 is easily facilitated by the inclusion of a grip or pull tab 70 that is easily grasped to move the pin 60 between engaged and disengaged orientations through substantially vertical movement of the pin 60 against the force of an upwardly biasing leaf spring 75.

A detachable handle 16 is provided at the outer distal end of the brace bar 15 for facilitating a user's grasp and movement of the bar 15 between extended and retracted configurations. The handle 16 serves a dual purpose, not only does it provide a grasp point, but it also acts as a barricade or retainer for a sport equipment piece 50 positioned thereupon. By the handle's 16 outer location, slippage of a loaded equipment piece 50 is prevented by the handle's 16 upward projection. The handle 16 is fastened to the brace bar 15 using a threaded tightenable connector 17 that establishes a friction fit between the components. As an aesthetic feature and for protection of the ends of the brace bar 15, end caps 18 are also included.

As explained above, utilization of the present invention of an equipment load assist assembly 10 in conjunction with a roof rack carrier 40 greatly assists a single person's loading of an elongate equipment piece, and especially elongate sport equipment pieces such as kayaks and canoes 50. Still further, through the utilization of such a specially designed assist 10, the loading process can be made safer and more secure for the operator and associated carrying structures.

INDUSTRIAL APPLICABILITY

The present invention finds applicability in the automotive manufacturing industries, as well as those industries that manufacture load carrier accessories for vehicles.

What is claimed and desired to be secured by Letters Patent is as follows:

1. A load assist to a vehicle rack carrier, said load assist comprising:
    a brace bar coupleable to a vehicle rack carrier, said brace bar being positionable between extended and retracted configurations relative to the vehicle rack carrier when coupled thereto, wherein said brace bar having an insert pin receiving aperture;
    a detachable connector coupling said brace bar to the vehicle rack carrier, said connector including a brace bar receiver adapted to accommodate a reciprocating motion of said brace bar therein and said connector including a too half and a bottom half that are adapted to be releasably coupled together to form said brace bar receiver and a cross bar receiver; and
    a biased insert pin being inserted into said insert pin receiving aperture, wherein said biased insert pin is provided across said aperture through said brace bar receiver and into said receiving aperture within said brace bar.

2. A load assist to a vehicle rack carrier, said load assist comprising:
    a brace bar coupleable to a vehicle rack carrier, said brace bar being positionable between extended and retracted configurations relative to the vehicle rack carrier when coupled thereto, wherein said brace bar having an insert pin receiving aperture;
    a detachable connector coupling said brace bar to the vehicle rack carrier, said connector including a brace bar receiver adapted to accommodate a reciprocating motion of said brace bar therein;
    a biased insert pin being inserted into said insert pin receiving aperture, wherein said biased insert pin is provided across said aperture through said brace bar receiver and into said receiving aperture within said brace bar; and
    a depressible safety stop projection extending through said brace bar and adapted to prevent unintentional disengagement of said brace bar from said load assist.

3. A load assist to a vehicle rack carrier, said load assist comprising:
    a brace bar coupleable to a vehicle rack carrier, said brace bar being positionable between extended and retracted configurations relative to the vehicle rack carrier; and
    a connector for coupling said brace bar to the vehicle rack carrier, said connector including a brace bar receiver configured about said brace bar to accommodate a reciprocating motion of said brace bar therein and said connector including a top half and a bottom half that are releasably coupled together to form said brace bar receiver and a cross bar receiver.

4. A load assist to a vehicle rack carrier, said load assist comprising:
    a brace bar coupleable to a vehicle rack carrier, said brace bar being positionable between extended and retracted configurations relative to the vehicle rack carrier; and
    a connector for coupling said brace bar to the vehicle rack carrier, said connector including a brace bar receiver configured about said brace bar to accommodate a reciprocating motion of said brace bar therein; and
    a depressible safety stop projection extending through said brace bar and adapted to prevent unintentional disengagement of said brace bar from said load assist system.

\* \* \* \* \*